US009069987B2

(12) United States Patent
Branish, II et al.

(10) Patent No.: US 9,069,987 B2
(45) Date of Patent: Jun. 30, 2015

(54) SECURE DATA ACCESS USING SQL QUERY REWRITES

(71) Applicant: International Business Machines Corporation, Armonk, NY (US)

(72) Inventors: Edward G. Branish, II, Hanover, NH (US); Veerabhadra R. Chinnam, Ponte Vedra Beach, FL (US); George R. Hughes, Jr., Overland Parks, KS (US); James C. Sun, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 13/923,609

(22) Filed: Jun. 21, 2013

(65) Prior Publication Data

US 2014/0380051 A1    Dec. 25, 2014

(51) Int. Cl.
*H04L 29/06* (2006.01)
*G06F 21/62* (2013.01)

(52) U.S. Cl.
CPC ........ *G06F 21/6227* (2013.01); *H04L 63/0428* (2013.01)

(58) Field of Classification Search
CPC ............... G06F 17/30289; G06F 17/30321; G06F 17/3033; G06F 17/30448; G06F 17/30451; G06F 17/30595; G06F 21/6218; G06F 21/6227; G06F 21/62; H04L 63/0428; H04L 63/04
USPC ......................................................... 713/167
See application file for complete search history.

(56) References Cited

U.S. PATENT DOCUMENTS

| 5,548,769 | A | 8/1996 | Baum et al. |
| 5,551,027 | A * | 8/1996 | Choy et al. ............................ 1/1 |
| 5,799,310 | A | 8/1998 | Anderson et al. |
| 7,185,004 | B1 | 2/2007 | Simmen et al. |
| 7,346,906 | B2 | 3/2008 | Kelly et al. |
| 7,720,840 | B2 | 5/2010 | Day et al. |
| 8,930,382 | B2 | 1/2015 | Branish, II et al. |
| 2002/0095405 | A1 * | 7/2002 | Fujiwara ........................... 707/3 |
| 2007/0220004 | A1 | 9/2007 | Fifield et al. |
| 2009/0055418 | A1 | 2/2009 | Megerian |
| 2009/0094193 | A1 | 4/2009 | King et al. |
| 2010/0023478 | A1 | 1/2010 | Chandrasekar et al. |

(Continued)

OTHER PUBLICATIONS

IBM; "Access control using a scalar algebra over relations and accessibility tables"; http://www.ip.com/pubview/IPCOM000176159D; Nov. 6, 2008, pp. 1-15.

(Continued)

*Primary Examiner* — Yogesh Paliwal
(74) *Attorney, Agent, or Firm* — David Zwick; Jeff LaBaw (57) ABSTRACT

A mechanism is provided for secure data access in a data processing system. A database having two tables is provided. A subset of the tables' primary key attributes is considered sensitive. A first user is authorized to access the primary key's sensitive attribute in an unmasked format, while a second user is authorized to access same data in a masked format. Two security views are generated granting the second user access to the primary key's sensitive attribute values of both tables in the masked format. The masked format value is generated from an unmasked format value using a reversible function. A join operation between the two security views is performed by optimizing a query statement corresponding to the join operation.

14 Claims, 7 Drawing Sheets

(56) References Cited

U.S. PATENT DOCUMENTS

2010/0042643 A1 2/2010 Pattabhi et al.
2011/0113050 A1* 5/2011 Youn et al. .................... 707/757

OTHER PUBLICATIONS

Anonymous; "System and Method to Efficiently Query Data in Distributed Environment Using Multi-Dimension Data Replica"; http://priorartdatabase.com/IPCOM/000209140D; Jul. 29, 2011, pp. 1-9.

IBM; "A Method and System to Answer the Describe Query for Linked Data Browsing of Relational Data"; http://www.ip.com/pubview/IPCOM000188589D; Oct. 15, 2009, pp. 1-10.

Wang, Q. et al.; "On the Correctness Criteria of Fine-Grained Access Control in Relational Databases"; VLDB '07; ACM 978-1-59593-649; Sep. 23, 2007.

Oracle Corporation; "Data Masking Best Practices"; www.oracle.com/whitepaper; Jul. 2010.

Pfister, G. et al.; "Parallel Equi-Join Algorithm for Large Relational Data Base Operations"; http://www.ip.com/pubview/IPCOM000040297D; Feb. 2, 2005.

Krieg, G.J. et al.; "Fast Table Joining in Relational Data Bases and Fast Row Retrieval"; http://www.ip.com/pubview/IPCOM000039669D; Feb. 1, 2005.

Cheng, J. M. et al.; "Multiple Indexed Access Path in a Relational Database System"; http://www.ip.com/pubview/IPCOM000100270D; Mar. 15, 2005.

Rask A. et al. "Implementing Row- and Cell-Level Security in Classified Databases Using SQL Server 2005", Published Apr. 1, 2005, http://technet.microsoft.com/en-us/library/cc966395.aspx.

OpenLink Software, "OpenLink Virtuoso Universal Server: Documentation—Preface," Chapter 9; SQL Reference; Section 9.29; SQL Inverse Functions, Last Accessed on Jan. 22, 2015, http:\\docs.openlinksw.com/virtuoso/sqlinverse.html.

* cited by examiner

FIG. 1

CUSTOMER_TRANSACTION_1_T — 202, 204, 206, 208

| ACCOUNT | TRANSACTION_ID | TRANSACTION_DATE | TRANSACTION_AMOUNT |
|---|---|---|---|
| 01020330302010 | 5445 | 5/1/2001 | 44.00 |
| 02030110302020 | 5555 | 5/5/2001 | 55.55 |
| 06777777777760 | 4455 | 5/12/2001 | 43.00 |
| 11111111111111 | 2222 | 8/17/2004 | 11.22 |

*FIG. 2A* — 150, 209

CUSTOMER_TRANSACTION_2_T — 242, 246, 248, 250, 252, 254

| ACCOUNT | TRANSACTION_ID | TRANSACTION_DATE | TRANSACTION_CITY | TRANSACTION_STATE | TRANSACTION_ZIP |
|---|---|---|---|---|---|
| 01020330302010 | 5445 | 5/1/2001 | ROCHESTER | MN | 55903 |
| 02030110302020 | 5555 | 5/5/2001 | NEW YORK | NY | 10005 |
| 06777777777760 | 4455 | 5/12/2001 | ROCHESTER | MN | 55903 |
| 11111111111111 | 2222 | 8/17/2004 | NEW YORK | NY | 10005 |

| SCRAMBLE | |
|---|---|
| x | f(x) |
| 0 | 7 |
| 1 | 5 |
| 2 | 3 |
| 3 | 1 |
| 4 | 8 |
| 5 | 6 |
| 6 | 4 |
| 7 | 2 |
| 8 | 9 |
| 9 | 0 |

| UnSCRAMBLE | |
|---|---|
| x | f(x) |
| 0 | 9 |
| 1 | 3 |
| 2 | 7 |
| 3 | 2 |
| 4 | 6 |
| 5 | 1 |
| 6 | 5 |
| 7 | 0 |
| 8 | 4 |
| 9 | 8 |

| UnSCRAMBLE(SCRAMBLE) | | |
|---|---|---|
| x | f(x) | f'(f(x)) |
| 0 | 7 | 0 |
| 1 | 5 | 1 |
| 2 | 3 | 2 |
| 3 | 1 | 3 |
| 4 | 8 | 4 |
| 5 | 6 | 5 |
| 6 | 4 | 6 |
| 7 | 2 | 7 |
| 8 | 9 | 8 |
| 9 | 0 | 9 |

SECURE DATA ACCESS USING SQL QUERY REWRITES

TECHNICAL FIELD

The present invention relates generally to computer database systems and more specifically to high performance secure data access in a database system.

BACKGROUND

Databases are computerized information storage and retrieval systems. A relational database management system (RDBMS) is a computer database management system that uses relational techniques for storing and retrieving data. Relational databases store data using structures that include one or more tables of rows and columns, which may be interrelated. A RDBMS typically uses Structured Query Language (SQL) for data definition, data management, and data access and retrieval. A database schema is used to specify how data is stored in a collection of tables and how the tables are related to one another. Using database query languages, such as SQL, data stored in a computer database may be retrieved, updated, and deleted. Updates may include creating new tables or dropping old tables, inserting, modifying, or deleting rows in an existing table, and copying tables or rows within the database.

One of the goals of a RDBMS is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

There are several types of database systems available, including parallel data processing systems. A parallel data processing system may include a RDBMS with enhancements that allow the data in the tables to be shared among the nodes (partitions) of massively parallel processing (MPP) system. A node can be an independent processor on an MPP machine, or a separate machine belonging to a clustered hardware environment. The RDBMS may perform join or subquery processing at the database partition in which the data is stored. This can have significant performance advantages. In MPP systems, the processing costs for performing non-collocated joins can become undesirable. As is understood, a join comprises a SQL operation that combines records from two or more tables. Efficient collocated joins are critical to the performance of database systems on parallel data processing systems.

SUMMARY

In one aspect, a method, system and program product for secure data access in a data processing system are provided. The method comprises providing a relational database having a first table and a second table. An attribute is selected as a subset of primary key attributes for the first table and for the second table. The attribute is considered sensitive, and needs to be prevented from unauthorized disclosure. The method further comprises generating a first security view. The first security view grants a user access to the sensitive attribute values of the first table in a masked format. The masked format values of primary key's sensitive attributes are generated from unmasked format values using a reversible function. The method further comprises generating a second security view. The second security view grants a user access to the sensitive attribute values of the second table in a masked format. The masked format values of primary key's sensitive attributes are generated from unmasked format values using a reversible function. The method further comprises performing a join operation between the first view and the second view by optimizing a first query statement corresponding to the join operation.

BRIEF DESCRIPTION OF THE SEVERAL VIEWS OF THE DRAWINGS

FIGS. 4A and 4B illustrate data in exemplary security views, according to one embodiment of the present invention.

DETAILED DESCRIPTION

Embodiments of the present invention will now be described with reference to the figures. Unless specifically stated otherwise, as apparent from the following discussion, it is appreciated that throughout the description, discussions utilizing terms such as "generating", "dividing", "receiving", "performing", "encrypting", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments of the present invention may be implemented generally within any data processing relational database management system environment suited for performing join operations. More specifically, a table may be divided among a plurality of processing nodes in the parallel data processing system. Such a mechanism is referred to herein as partitioning. Typically, a table is partitioned on a primary key by hashing the rows on the primary key value and distributing the rows to a particular processing node based on the primary key hash value (also known as partitioning key or hash key). To achieve high performance, a technique known as join collocation is typically used in the parallel data processing system. The database management system is capable of recognizing when data being accessed for a join or a subquery is located at the same database partition. This is known as table collocation. Rows in collocated tables with the same distribution key values are located on the same database partition. A collocated join occurs locally on the partition where the data resides. After the local joins complete on all partitions, the partial results are combined, producing a global result which would be identical to the result obtained on a non-parallel processing relational database management system environment. For the optimizer program to consider a collocated join, the joined tables should be collocated, have distribution keys with the same number of attributes, have the corresponding attributes of the distribution key be database partition-compatible, and all pairs of the corresponding partitioning key attributes should participate in equality join predicates.

Typically, in data processing systems, access to some of the tables' primary key attribute values is denied due to security and privacy concerns with regard to "sensitive attributes". In the data processing system described herein, instead of denying access altogether, the primary key's sensitive attribute values are masked before they are provided to a user. As used herein, the term "masking" refers to the process of providing data that conforms to particular characteristics, such as data type and data format, without revealing sensitive underlying data. Depending on the users' role and their authority level within the enterprise, each user will typically see either unmasked text or a masked version of the primary key's sensitive attribute, but not both.

Embodiments of the invention are described herein relative to the widely used SQL query language. However, various embodiments of the invention are not limited to the SQL query language. Embodiments of the invention may be adapted to relational database queries composed in other query languages. Furthermore, embodiments of the present invention are not limited to relational database systems. Embodiments of the invention may be adapted to non-relational database systems.

Figure 1:
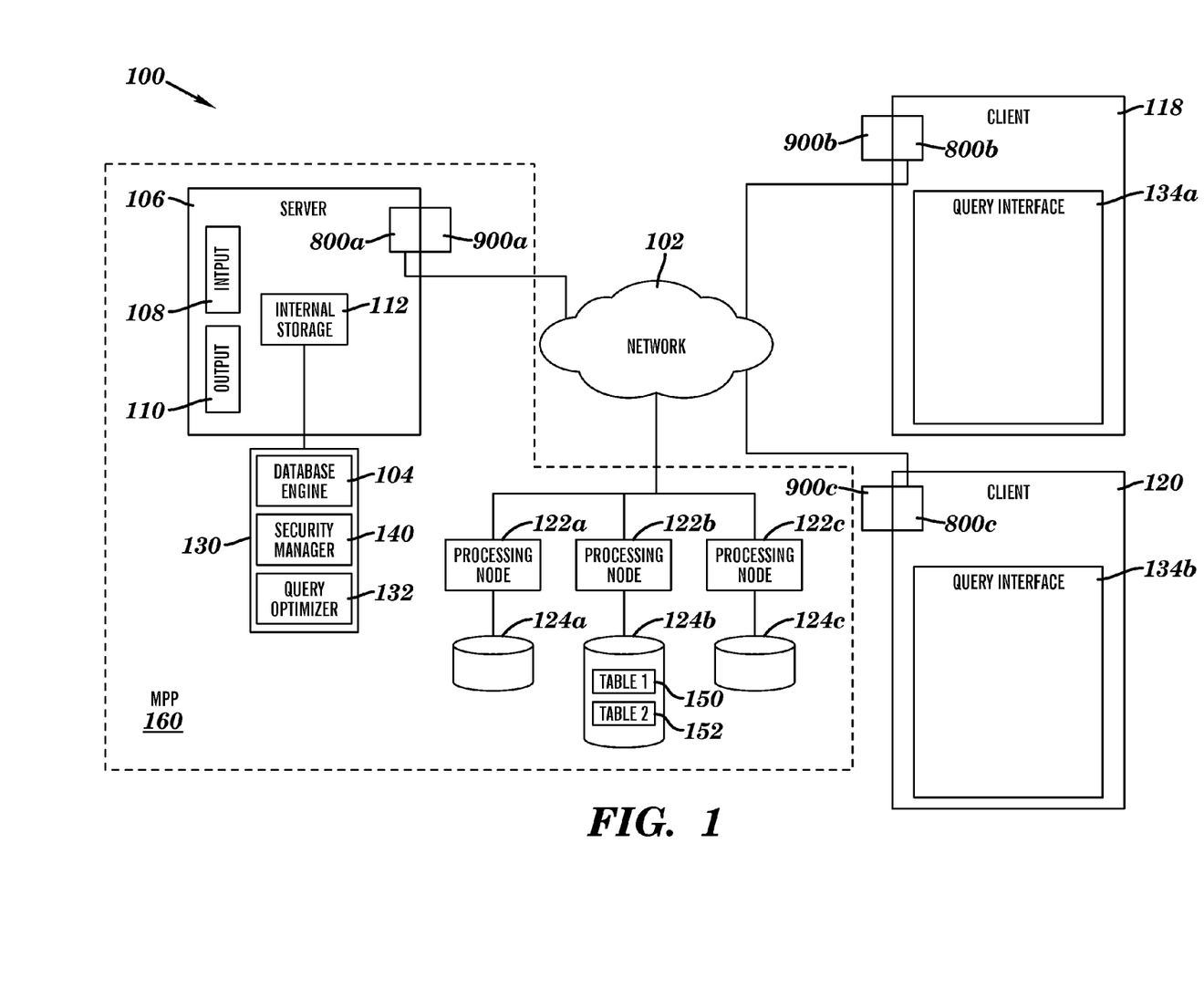
FIG. 1 is an illustration of an exemplary architecture for a parallel data processing system that is suited for implementing secure data access using query rewrites operations in accordance with an embodiment of the present invention.

FIG. 1 is an illustration of an exemplary architecture for a data processing system that is suited for implementing secure data access using query rewrite operations in accordance with an embodiment of the present invention. FIG. 1 is intended as an exemplary embodiment, not as an architectural limitation for different embodiments of the present invention, and therefore, the particular elements shown in FIG. 1 should not be considered limiting with regard to the environments in which the illustrative embodiments of the present invention may be implemented. Additionally, those skilled in the art will recognize that the elements illustrated in FIG. 1 are simplified to highlight aspects of the present invention and that computing environments and networks typically include a variety of additional elements not shown in FIG. 1. Embodiments of the invention are described herein relative to relational database systems implemented on parallel data processing systems, such as a Massively Parallel Processing (MPP) System. However, various embodiments of the invention are not limited to parallel database implementations. Embodiments of the invention may be adapted to non-parallel database implementations. As shown in FIG. 1, the data processing system 100 includes two client computers 118 and 120 coupled to a server computer 106 and one or more processing nodes 122a-122c, that manage the storage and retrieval of data in storage devices 124a-124c, via a network 102 such as the Internet. For simplicity purposes, only three processing nodes 122a, 122b and 122c and only three storage devices 124a, 124b, and 124c are shown in FIG. 1, although in other embodiments, data processing system 100 can include additional processing nodes connected to additional storage devices. The data processing system 100 includes the RDBMS 130 built upon a massively parallel processing (MPP) system 160.

As shown, the data processing system 100 includes one or more processing nodes 122a-122c that manage the storage and retrieval of data in storage devices 124a-124c. Each of the processing nodes hosts one or more logical nodes or data partitions, such as one or more database instances. Each of the processing nodes 122a-122c manages a portion of a database that is stored in a corresponding one of the storage devices 124a-124c. In an embodiment, each of the processing nodes 122a-122c manages the corresponding portion of the database using a schema (not shown in FIG. 1). The schema provides a description of how the data is represented and organized within the database built upon MPP system 160. For a relational database, the schema specifies the tables, attributes of the tables, and relationships between the tables. In addition, the schema specifies the data types of attributes in a table and any constraints on a table or attribute. For example, the schema identifies relationships enforced as a referential integrity constraint between first table 150 and second table 152 of the database hosted by the parallel data processing system 100. Each of the storage devices 124a-124c includes one or more hard-disk drives or other storage medium, such as flash memory devices, optical media, and the like.

The system stores data in one or more tables 150, 152 in the storage devices 124a-124c. At least in some embodiments the rows of the tables 150, 152 are stored across multiple storage devices 124a-124c to ensure that the system workload is distributed evenly across the processing nodes 122a-122c.

As will be discussed with reference to FIG. 7, server computer 106 includes internal components 800a and external components 900a, client computer 118 includes internal components 800b and external components 900b, and client computer 120 includes internal components 800c and external components 900c. For simplicity purposes, only two client computers 118 and 120 are shown in FIG. 1, although in other embodiments, data processing system 100 can include additional client computers. Network 102 represents a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Alternatively, the computers and other devices of distributed data processing system 100 may be interconnected by different types of networks, such as an intranet, a local area network (LAN), or a wide area network (WAN). Network 102 may include communication connections, such as wire, wireless communication links, or fiber optic cables.

Client computers 118 and 120 may be, for example, mobile devices, telephones, personal digital assistants, netbooks, laptop computers, tablet computers, desktop computers, or any type of computing devices capable of hosting a query interface 134a and 134b. In one embodiment, query interface 134a and 134b provides a software application that allows users to create, read, update and delete information stored in storage devices 124a-124c. Query interface 134a, 134b allows users to compose and submit SQL commands to a RDBMS 130, which, in response, may be configured to process the SQL and return query information, or results of update actions.

Typically, query interfaces 134a and 134b display information via a display device 920 of external components 900b (shown in FIG. 7) and a display device 920 of external components 900c (shown in FIG. 7), respectively, such as a monitor, a laptop screen, television, or the like, and receive input from the user via one or more input devices which can include, without limitation, a keyboard, a mouse, a trackball, a digitizing tablet, and the like.

As shown in FIG. 1, server computer 106 includes a RDBMS 130 that includes a database engine program 104, query optimizer program 132 and security manager program 140. In one embodiment, the actions performed by RDBMS 130 are controlled via query interface 134a or 134b. RDBMS 130 receives queries in a form of SQL statements. Database engine program 104 is used to create, retrieve, update, and delete data from storage devices 124a-124c. Database engine program 104 may also perform other database operations. For example, in an embodiment of the present invention, database engine program 104 organizes the storage of data and the distribution of table rows among the processing nodes 122a-122c.

Database engine program 104 may also coordinate the retrieval of data from the storage devices 124a-124c in response to queries received from a user, such as one using query interface 134a and 134b. In an embodiment, database engine program 104, on receiving an incoming database query, sends the query to query optimizer program 132. In an embodiment, query optimizer program 132 includes program instructions executable by server computer 106 to optimize a query and/or select an optimal query execution plan. Selecting the optimal query execution plan includes, among other things, identifying which of the processing nodes 122a-122c are involved in executing the query, as well as choosing which data manipulation techniques will serve best in satisfying the conditions of the query. In an embodiment, security manager program 140 includes program instructions executable by server computer 106 to control access to data that is subject to data security management.

Controlling access to sensitive data includes determining whether to grant access to the requested data in either a masked or an unmasked format based at least in part on a requesting user's authentication credentials. Database engine program 104, query optimizer program 132, and security manager program 140 located in data processing system 100 may be stored on one or more computer-readable tangible storage devices, which may include internal storage 112 on server computer 106. Data processing system 100 may include additional server computers, client computers, displays and other devices not shown. Server computer 106 may contain an input device 108 and an output device 110. FIGS. 2A-6 provide an example of a high performance secure data access in data processing system 100 using an example customer database containing at least two transaction tables 150 and 152.

Figure 2A:
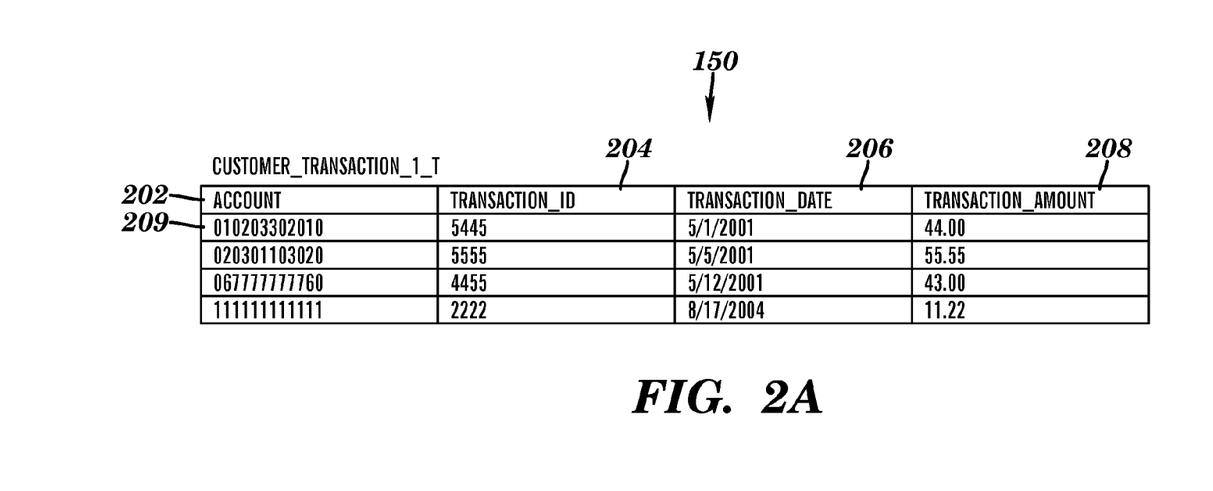
FIGS. 2A and 2B illustrate data in exemplary customer transaction tables, according to one embodiment of the present invention.

FIGS. 2A and 2B illustrate data in exemplary customer transaction tables, according to one embodiment of the present invention. The database tables are typically generated through a "CREATE TABLE" statement that specifies the table name (or relationship) and the attributes that make up the table. An example of a "CREATE TABLE" SQL statement that generated CUSTOMER_TRANSACTION1_T table 150 (referred to herein as a first transaction table) illustrated in FIG. 2A, is provided below:

```
CREATE TABLE CUSTOMER_TRANSACTION1_T (
ACCOUNT              INTEGER NOT NULL,
TRANSACTON_ID        INTEGER NOT NULL,
TRANSACTION_DATE     DATE NOT NULL,
TRANSACTION_AMOUNT   DECIMAL(15,2) NOT NULL
PRIMARY KEY (ACCOUNT) )
DISTRIBUTE BY HASH (ACCOUNT);
```

First transaction table 150 includes four attributes: "ACCOUNT" 202, "TRANSACTION_ID" 204, "TRANSACTION_DATE" 206, and "TRANSACTION_AMOUNT" 208. Illustratively, the first row 209 in first transaction table 150 contains the following values:

```
ACCOUNT:              010203302010
TRANSACTION_ID:       5445
TRANSACTION_DATE:     5/1/2001
TRANSACTION_AMOUNT:   44.00
```

Other rows of first transaction table 150 include similar values related to transactions. Illustratively, first transaction table 150 includes four rows. It should be noted, that any given row of data of table 150 is eligible to be stored in any of the processing nodes 122a-122c. In one implementation consistent with an embodiment of the present invention, a unique index on the first transaction table 150 may be generated. Unique indices are typically faster because at most one row in the table matches a search. An example of a "CREATE INDEX" SQL statement is provided below:

CREATE UNIQUE INDEX CUST_TRAN1_ACCTIX
ON CUSTOMER_TRANSACTION1_T (ACCOUNT);

The table definition above specifies that rows are mapped to a particular partition based on a partitioning key. More specifically, the table definition specifies that a hash value of the "ACCOUNT" attribute serves as the partitioning key. For example, database engine program 104 may need to add an additional processing node, such as processing node 122c, to a list of processing nodes storing data in first transaction table 150, database engine program 104 uses the partitioning key attribute as a reorganization mechanism. A variety of well known in the art techniques may be used for partitioning tables. In an embodiment of the present invention, hash function applied to the values of the "ACCOUNT" attribute may include, for example, linear hash function, modulo hash function, and the like.

Figure 2B:
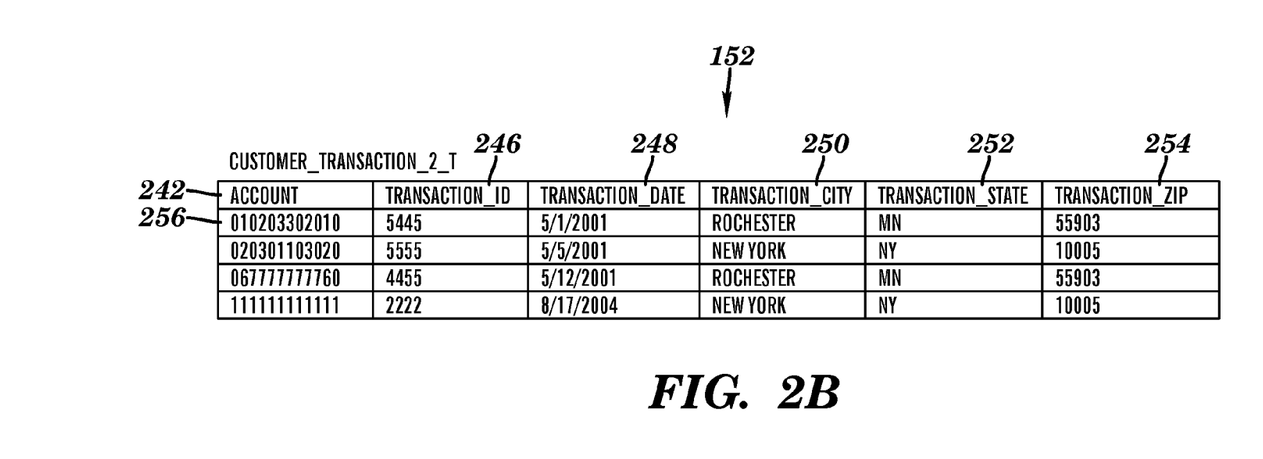

An example of a create table SQL statement that generated CUSTOMER_TRANSACTION2_T table (referred to herein as a second transaction table) 152 illustrated in FIG. 2B, is provided below:

```
CREATE TABLE CUSTOMER_TRANSACTION2_T (
ACCOUNT              INTEGER NOT NULL,
TRANSACTION_ID       INTEGER NOT NULL,
TRANSACTION_DATE     DATE NOT NULL,
TRANSACTION_CITY     VARCHAR(30) NOT NULL,
TRANSACTION_STATE    CHAR(2) NOT NULL,
TRANSACTION_ZIP      DECIMAL(5,0) NOT NULL
PRIMARY KEY (ACCOUNT)
DISTRIBUTE BY HASH (ACCOUNT);.
```

Second transaction table 152 includes six attributes: "ACCOUNT" 242, "TRANSACTION_ID" 246, "TRANSACTION_DATE" 248, "TRANSACTION_CITY" 250, "TRANSACTION_STATE" 252, and "TRANSACTION_ZIP" 254. Illustratively, the first row 256 in second transaction table 152 contains the following values:

```
ACCOUNT:            010203302010
TRANSACTION_ID:     5445
TRANSACTION_DATE:   5/1/2001
TRANSACTION_CITY:   Rochester
TRANSACTION_STATE:  MN
TRANSACTION_ZIP:    55903
```

Other rows of second transaction table 152 include similar values related to transaction location. Similarly to the first transaction table 150, "ACCOUNT" serves as a partitioning key.

In one implementation consistent with an embodiment of the present invention, a unique index on the second transaction table 152 may be generated. An example of a "CREATE INDEX" SQL statement to generate unique indices for the second transaction table 152 is provided below:
 CREATE UNIQUE INDEX CUST_TRAN2_ACCTIX ON CUSTOMER_TRANSACTION2_T (ACCOUNT);

According to an embodiment of the present invention, "ACCOUNT" represents a sensitive attribute of the primary key that is subject to data security management. In other words, in an embodiment of the present invention, only users with predetermined authentication credentials should have access to an unmasked value of the "ACCOUNT" attributes 202 and 242 stored in first transaction table 150 and second transaction table 152. It should be noted that in some embodiments, the primary key may be a composite key containing one or more sensitive attributes.

Figure 3:
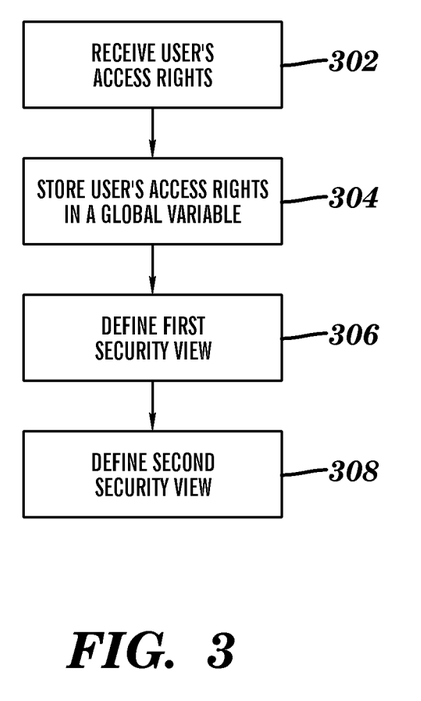
FIG. 3 illustrates steps performed by security manager program for controlling secure data access, according to one embodiment of the present invention.

FIG. 3 illustrates steps performed by security manager program for controlling secure data access, according to one embodiment of the present invention. The security manager program can be, for example, security manager program 140 of FIG. 1. The security manager program 140 controls access to sensitive data (for example, "ACCOUNT" attribute) by employing at least one reversible functions and an inverse of the reversible function, as described below. As used herein, the term "reversible function" refers to a function f(X), X={x$_1$, x$_2$, ..., x$_n$} which maps each input state to a unique output state. In other words there is a one-to-one relationship between input and output states. As used herein, the term "inverse of a function" refers to a function which reverses the effect of the original function.

At step 302, security manager program 140, executing on server computer 106 of FIG. 1, receives a user access request that contains predefined authentication credentials of the user requesting access to either first transaction table 150 or second transaction table 152. In an embodiment, authentication credentials are obtained by RDBMS 130 in response to the user's attempt to connect to the database. The credentials can include information associated with the user's role within an enterprise. As previously indicated, values contained in some attributes, such as "ACCOUNT" 202 and 242 of FIG. 2, are protected and access to such sensitive data is restricted at least for some authenticated users.

According to an embodiment of the present invention, at step 304, security manager program 140 stores user's credentials in a global variable. For example, security manager program 140 may use the following SQL statement to create the global variable, such as, "USER_TYPE":
 CREATE VARIABLE USER_TYPE SMALLINT DEFAULT 1;

In an embodiment, the value of the USER_TYPE variable equal to 0 indicates that the requesting user has authorization to access unmasked value of the protected attribute, while the value of the USER_TYPE variable equal to 1 indicates that the requesting user is permitted to access only masked value of the protected attribute.

At step 306, security manager program 140 defines a first security view 500 using the following exemplary SQL statement:

CREATE VIEW CUSTOMER_TRANSACTION1 AS (A)
SELECT SCRAMBLE(ACCOUNT) AS ACCOUNT,
TRANSACTION_ID,
TRANSACTION_DATE, TRANSACTION_AMOUNT
FROM CUSTOMER_TRANSACTION1_T;

In accordance with an embodiment of the present invention, as discussed below in conjunction with FIG. 4A, the first security view 500 employs an exemplary reversible function—"SCRAMBLE"—to map the unmasked attribute value, such as unmasked account number "ACCOUNT", to the version of the attribute value, be it masked or unmasked, the requesting user is permitted to access with respect to first transaction table 150.

At step 308, security manager program 140 defines a second security view 502 using the following exemplary SQL statement:

CREATE VIEW CUSTOMER_TRANSACTION2 AS (B)
SELECT SCRAMBLE(ACCOUNT) AS ACCOUNT,
TRANSACTION_ID,
TRANSACTION_DATE, TRANSACTION_AMOUNT
FROM CUSTOMER_TRANSACTION1_T;

In accordance with an embodiment of the present invention, as discussed below in conjunction with FIG. 4A, the second security view 502 also employs the reversible "SCRAMBLE" function—to map the unmasked attribute value, such as unmasked account number "ACCOUNT", to the version of the attribute value, be it masked or unmasked, the requesting user is permitted to access with respect to the second transaction table 152.

Thus, in an embodiment of the present invention, as discussed below in conjunction with FIGS. 4A-4C and 5A-5B, the security manager program 140 protects sensitive attributes of the transaction tables by allowing users having different authority levels to access the transaction tables via a plurality of views generated by the security manager program 140. According to an embodiment of the present invention, each of the security views may employ one or more reversible data encryption functions.

Figure 4A:
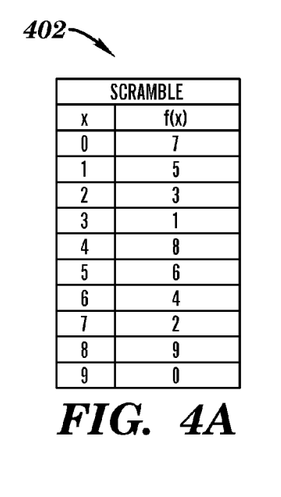
FIGS. 4A-4C illustrate an encryption system, in accordance with one embodiment of the present invention.
Figure 4B:
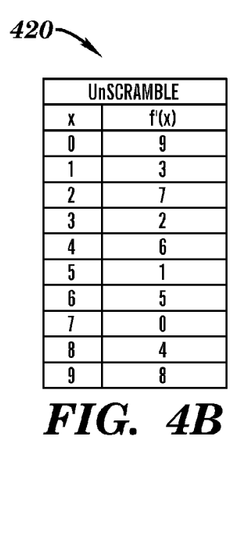
Figure 4C:
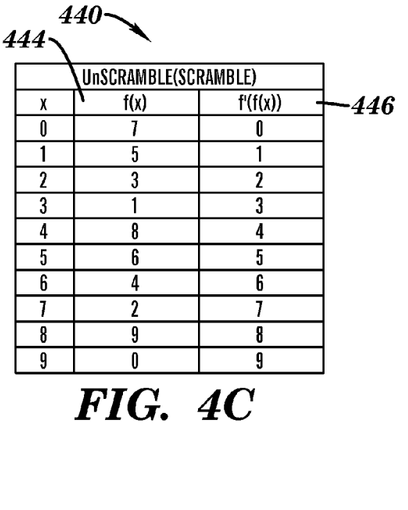

FIGS. 4A-4C illustrate an encryption system, in accordance with one embodiment of the present invention. Encryption is a process of transforming information (referred to herein as unmasked attribute values) into an encrypted form (referred to herein as masked attribute values). Decryption is a transformation that recovers the plaintext information from the encrypted form. The plaintext information is enciphered via an encryption transformation and the encrypted (masked) format is deciphered via a decryption transformation. According to an embodiment of the present invention, encryption transformation is performed by an exemplary "SCRAMBLE" function, and decryption transformations are performed by a decryption function ("UNSCRAMBLE") of the cipher. In one embodiment, SCRAMBLE/UNSCRAMBLE functions include a block cipher. Block ciphers are substitution ciphers that operate on fixed-length groups of bits known as blocks. Where data to be encrypted is longer than a block, the data is divided into multiple blocks, and each block is separately encrypted.

FIG. 4A illustrates an exemplary scramble key 402 that may be used by the security manager 140 to encrypt unmasked attribute values in first transaction table 150 and second transaction table 152 into masked attribute values, according to one embodiment of the present invention. The illustrated scramble key 402 may be used if the domain of attribute values is limited to numeric values only. As previously indicated, the security manager program 140 uses (at steps 306 and 308) the encryption function in order to map the unmasked attribute value, such as unmasked account number, based for example, on an indicator attribute, such as "ACCOUNT_TYPE", to the version of the attribute value, be it masked or unmasked, the requesting user is permitted to access. A first column of the scramble key 402 includes unmasked attribute values, while a second column includes corresponding masked values. Illustratively, security manager program 140, using the scramble key 402, maps unmasked attribute 209 contained in the first row of the first transaction table 150 into masked attribute 504 shown in FIG. 5A. Alternatively, security manager program 140 may present unmasked attribute 209 unchanged, if the requesting user has authority to access sensitive attributes. The requesting user's authority may be determined based on the indicator attribute. It should be noted that in an embodiment of the present invention, the security manager program 140 populates the "ACCOUNT_TYPE" attribute (not shown) with two different values "0" and "1", where "0" indicates unmasked value (in the "ACCOUNT" attribute 202) and "1" indicates masked value (in the "ACCOUNT" attribute 202).

FIG. 4B illustrates an exemplary unscramble key 420 that may be used by the security manager 140 to decrypt masked attribute values in first transaction table 150 and second transaction table 152 back into unmasked attribute values, according to one embodiment of the present invention. The illustrated unscramble key 420 may be used if the domain of attribute values is limited to numeric values only. The first column of the unscramble key 420 includes masked attribute values, while a second column includes corresponding unmasked values. Illustratively, security manager program 140, using the unscramble key 420, transforms masked attribute 504 shown in FIG. 5A back into unmasked attribute 209 contained in the first row of the first transaction table 150.

FIG. 4C illustrates how a combination of a reversible function ("SCRAMBLE") and its inverse ("UNSCRAMBLE") can be combined to perform transparent transformations of data between masked and unmasked formats. Generally, a pair of reversible function f(x) and its inverse $f^{-1}(x)$ have the following property:

$$f^{-1}(f(x))=x.$$

FIG. 4C illustrates that "SCRAMBLE" function is reversible. In other words, an application of UNSCRAMBLE function 446 to results of SCRAMBLE function 444, reverses the first (SCRAMBLE) function, as evidenced by the first and third columns in FIG. 4C having equivalent values.

Figure 5A:
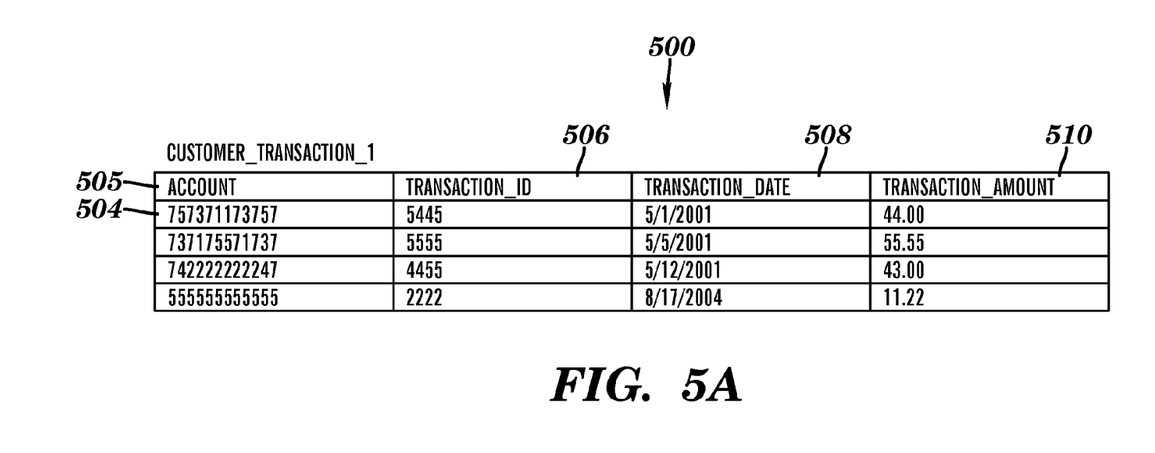
FIGS. 5A and 5B illustrate how transaction information is presented to database users having authority to see sensitive attributes in masked format only, according to one embodiment of the present invention

FIGS. 5A and 5B illustrate how transaction information is presented to database users having authority to see sensitive attributes in masked format only, according to one embodiment of the present invention. For illustration purposes only assume that a first user is authorized to see account values in first transaction table 150 in a masked format. The first user sends a request to access data in first transaction table 150 via, for example, query interface program 134a. In an embodiment of the present invention, query interface program 134a forwards the first user's request to the security manager program 140. In response to receiving the first user's request, according to an embodiment of the present invention, security manager program 140 performs steps discussed above in conjunction with FIG. 3, including creating and executing the first view (as shown at 306). Subsequently, security manager program 140 sends first view execution results back to the query interface program 134a. In response, the query interface program 134a presents first view execution results 500 to the user in the form shown in FIG. 5A. As shown in FIG. 5A, attributes "TRANSACTION_ID" 506, "TRANSACTION_DATE" 508 and "TRANSACTION_AMOUNT" 510 contain data derived from the respective attributes 204, 206, and 208 of the first transaction table 150. It should be noted that sensitive data (account values) are presented in "ACCOUNT" attribute 505 in masked format based on first user's authority level.

Figure 5B:
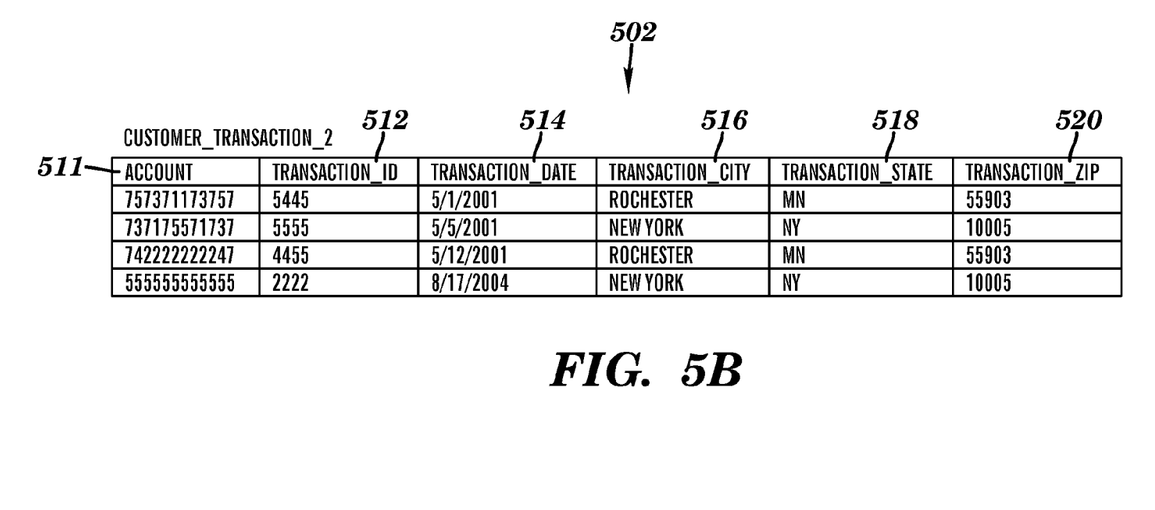

FIG. 5B illustrates second view execution results 502 that may be presented by query interface program 134a in response to second user's request to access second transaction table 152. For illustration purposes only assume that a second user is authorized to see account values in second transaction table 152 in a masked format. As shown in FIG. 5B, attributes "TRANSACTION_ID" 512, "TRANSACTION_DATE" 514 and "TRANSACTION_CITY" 516, "TRANSACTION_STATE" 518, and "TRANSACTION_ZIP" 520 contain data derived from the respective attributes 246, 248, 250, 252, and 254 of the second transaction table 152. It should be noted that sensitive data (account values) are presented in "ACCOUNT" attribute 511 in masked format based on first user's authority level.

In summary, in accordance with an embodiment of the present invention, security manager program 140 prevents users from seeing both unmasked and masked sensitive data and, therefore, protects the masking mechanism from being reverse engineered. Furthermore, security manager program 140 implemented in accordance with an embodiment of the present invention, advantageously allows a given user to transparently query the transactional data using either masked or unmasked version of the primary key's sensitive attributes, but never both of them.

Figure 6:
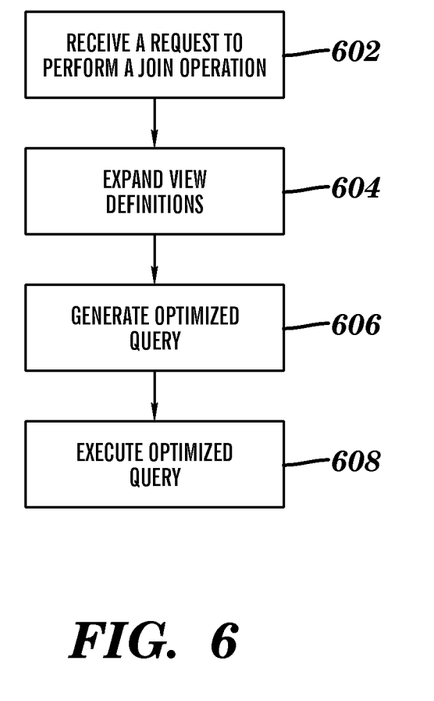
FIG. 6 illustrates steps performed by query optimizer program for performing efficient join operations using the security views, in accordance with an embodiment of the present invention.

FIG. 6 illustrates steps performed by query optimizer program for performing efficient join operations using the transaction tables and security views, in accordance with an embodiment of the present invention. In accordance with an embodiment of the present invention, the data processing system 100 described herein, when implemented on a MPP System, supports an efficient collocated joins between the transactional tables. Collocated join operation, as used herein, refers to a join operation where corresponding rows of the joined tables are located on the same processing node, such as processing nodes 122a-122c and each corresponding partitioning key attribute is in an equal predicate. This type of join is done at the node-level and requires less communication overhead.

At step 602, query optimizer program 132 receives a request to run a query requiring a join operation between the first and second security views from, for example, query interface program 134a. The following steps describe a process that query optimizer program 132 uses to optimize the received join operation query, in accordance with an embodiment of the present invention. For illustrative purposes only assume that query optimizer program 132 has received the following query requiring a join operation:

```
SELECT A.ACCOUNT, A.TRANSACTION_ID,           (1)
A.TRANSACTION_DATE, A.TRANSACTION_AMOUNT,
B.TRANSACTION_CITY, B.TRANSACTION_STATE,
B.TRANSACTION_ZIP
FROM CUSTOMER_TRANSACTION1 A,
CUSTOMER_TRANSACTION2 B
WHERE A.ACCOUNT = 010203302010
AND B.ACCOUNT = A.ACCOUNT
AND B.TRANSACTION_ID=A.TRANSACTION_ID
AND B.TRANSACTION_DATE = A.TRANSACTION_DATE;
```

At step 604, query optimizer program 132 expands the view definitions. More specifically, query optimizer program 132 expands the definitions for the first view (A) (CUSTOMER_TRANSACTION1) and the second view (B) (CUSTOMER_TRANSACTION2). Query (2) below is an example of the expanded query (1):

```
SELECT SCRAMBLE (A.ACCOUNT),            (2)
    A.TRANSACTION_ID,
    A.TRANSACTION_DATE, A.TRANSACTION_AMOUNT,
    B.TRANSACTION_CITY,B.TRANSACTION_STATE,
    B.TRANSACTION_ZIP
    FROM CUSTOMER_TRANSACTION1_T A,
    CUSTOMER_TRANSACTION2_T B,
    WHERE SCRAMBLE (A.ACCOUNT) = 010203302010
    AND SCRAMBLE (B.ACCOUNT)=SCRAMBLE (A.ACCOUNT)
    AND B.TRANSACTION_ID = A.TRANSACTION_ID
    AND B.TRANSACTION_DATE = A.TRANSACTION_DATE;
```

At step 606, in accordance with an embodiment of the present invention, query optimizer program 132 generates an optimized query. Query (3) below is an example of optimized query (2):

```
SELECT SCRAMBLE (A.ACCOUNT),            (3)
    A.TRANSACTION_ID,
    A.TRANSACTION_DATE, A.TRANSACTION_AMOUNT,
    B.TRANSACTION_CITY,B.TRANSACTION_STATE,
    B.TRANSACTION_ZIP
    FROM CUSTOMER_TRANSACTION1_T A,
    CUSTOMER_TRANSACTION2_T B,
    WHERE A.ACCOUNT = UNSCRAMBLE(010203302010)
    AND B.ACCOUNT=A.ACCOUNT
    AND B.TRANSACTION_ID = A.TRANSACTION_ID
    AND B.TRANSACTION_DATE = A.TRANSACTION_DATE;
```

In this step, according to one embodiment of the present invention, query optimizer program 132 simplifies query (2) by utilizing at least the following inherent properties of reversible functions:

$$f(x)=f(y) \rightarrow x=y \qquad \text{a)}$$

$$f(x)=c \rightarrow x=f^{-1}(c) \qquad \text{b)}$$

Thus, query optimizer program 132 rewrites the predicate for query (2). Specifically, in the illustrated embodiment, query optimizer program 132 replaces the expression "SCRAMBLE (A.ACCOUNT)=010203302010" in Query (2) with the expression "A.ACCOUNT=UNSCRAMBLE (010203302010)" in Query (3) using the combination of reversible function and its inverse (see property (b) above). Similarly, query optimizer program 132 replaces the expression "SCRAMBLE (B.ACCOUNT)=SCRAMBLE (A.ACCOUNT)" in Query(2) with the expression "B.ACCOUNT=A.ACCOUNT" in Query (3) (see property (a) above). Database engine program 104 executes the optimized query (3) (instead of query (1)), in response to the user's request to perform the join operation involving transaction tables. Since the optimized query (3) contains equijoin predicates between all corresponding partitioning key attributes of the transaction tables, i.e. "B.ACCOUNT=A.ACCOUNT", a collocated join may be used to execute the query. The query optimizer program 132 may exploit other aspects of the optimized query (3). For example, removal of the two invocations of the SCRAMBLE function in query (2), may reduce or eliminate restrictions on the join algorithms considered by the query optimizer, may eliminate the runtime overhead of multiple function calls to the SCRAMBLE function, as well as simplifying the work involved in determining relative access plan costs. The simplification of the local predicate "SCRAMBLE(A.ACCOUNT)=010203302010" in Query(2) with the expression "A.ACCOUNT=UNSCRAMBLE(010203302010)" in Query (3) may allow more efficient data access via an index. In other embodiments of the present invention query optimizer program 132 may utilize additional properties of a function on a specific case by case basis. For example, when f(x)=−x:

$$f(x)>f(y) \rightarrow x<y \qquad \text{c)}$$

$$f(x)\geq f(y) \rightarrow x\leq y \qquad \text{d)}$$

$$f(x)<f(y) \rightarrow x>y \qquad \text{e)}$$

$$f(x)\leq f(y) \rightarrow x\geq y \qquad \text{f)}$$

These properties may be useful, for example, for exploiting indices for range delimiting predicates, generating additional predicates through transitive closure, as well as other query optimization techniques. Therefore, by performing steps described above, in accordance with an embodiment of the present invention, query optimizer program 132 provides data processing RDBMS 133 with a high performance join operation, while at the same time, the data processing RDBMS 133 prevents the end users from accessing the transaction tables' 150 and 152 primary key's sensitive attributes by allowing access to the transaction tables 150 and 152 via the first and second security views, 500 and 502, respectively.

Figure 7:
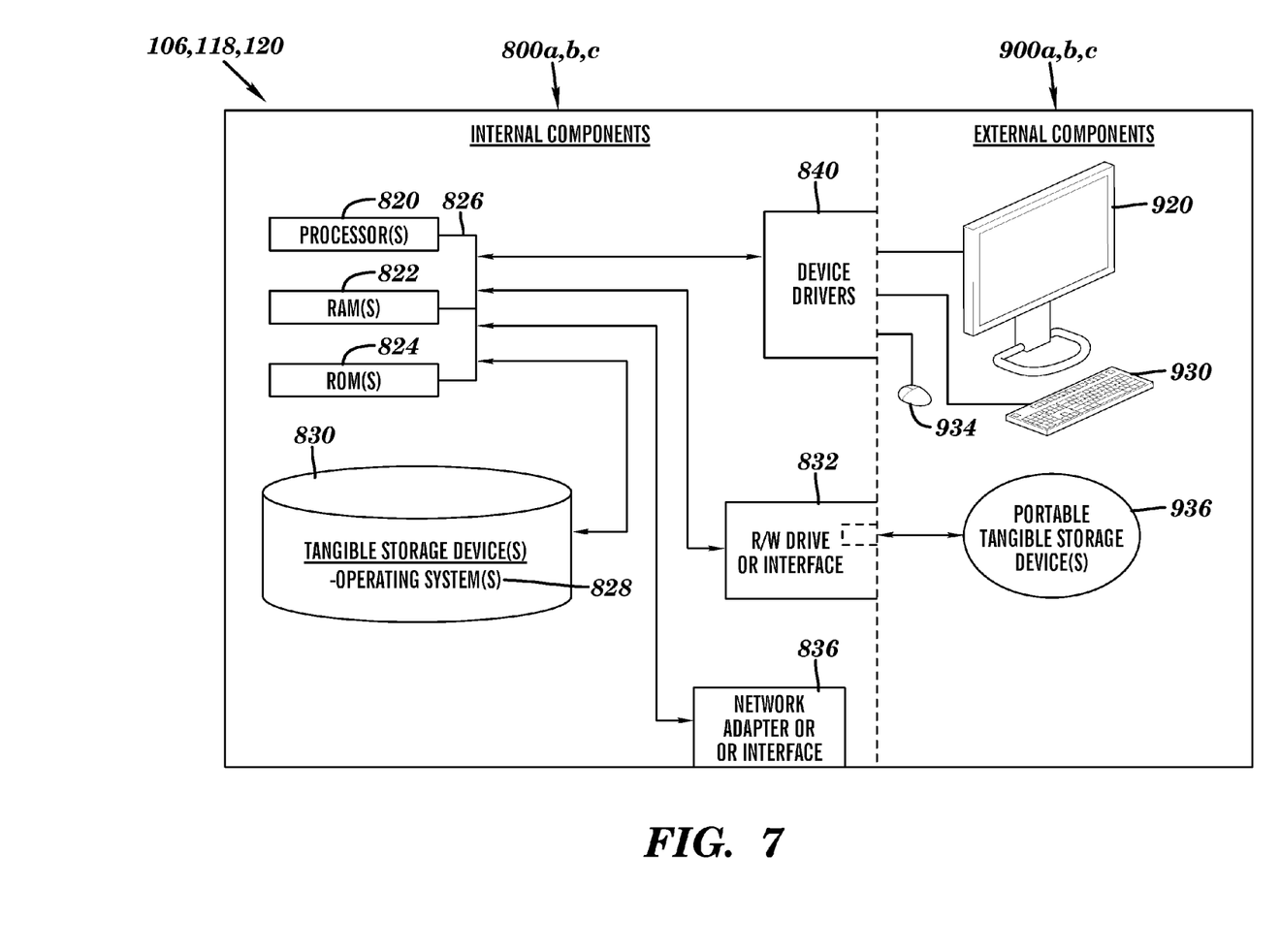
FIG. 7 is a block diagram of internal and external components of each of the computers of FIG. 1.

FIG. 7 is a block diagram of internal and external components of each of the computers of FIG. 1. Computers 106, 118 and 120 include respective sets of internal components 800a, b, c and external components 900a, b, c. Each of the sets of internal components 800a, b, c includes one or more processors 820, one or more computer-readable RAMs 822 and one or more computer-readable ROMs 824 on one or more buses 826, one or more guest operating systems 828 and one or more computer-readable tangible storage devices 830. The one or more operating systems 828 are stored on one or more of the computer-readable tangible storage devices 830 for execution by one or more of the processors 820 via one or more of the RAMs 822 (which typically include cache memory). Database engine program 104, security manager program 140, and query optimizer program 132 are stored on one or more of the computer-readable tangible storage devices 830 of internal components 800a for execution by one or more of the processors 820 of internal components 800a via one or more of the RAMs 822 of internal components 800a. Query interface program 134a and 134b is stored on one or more of the computer-readable tangible storage devices 830 of internal components 800b and 800c for execution by one or more of the processors 820 of internal components 800b and 800c via one or more of the RAMs 822 of internal components 800b and 800c. In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b,c also includes a R/W drive or interface 832 to read from and write to one or more portable computer-readable tangible storage devices 936 such as a CD-ROM, DVD, memory stick, magnetic tape, magnetic disk, optical disk or semiconductor storage device. At least one of the database engine program 104, security manager program 140, and query optimizer program 132 can be stored on one or more of the portable computer-readable tangible storage devices 936 of external components 900a, read via R/W drive or interface 832 of internal components 800a and loaded into one or more computer-readable tangible storage devices 830 of internal components 800a. Query interface program 134a and 134b can be stored on one or more of the portable computer-readable tangible storage devices 936 of external components 900b and 900c, read via R/W drive or interface 832 of internal components 800b and 800c and loaded into one or more computer-readable tangible storage devices 830 of internal components 800b and 800c, respectively.

Each set of internal components 800a,b,c also includes a network adapter or interface 836 such as a TCP/IP adapter card. Database engine program 104, security manager program 140, and query optimizer program 132 can be downloaded to server computer 106 and query interface program 134a and 134b can be downloaded to client computers 118 and 120, respectively, from an external computer via a network (for example, the Internet, a local area network or other, wide area network) and network adapter or interface 836 of internal components 800a, 800b and 800c, respectively. From the network adapter or interface 836 of internal components 800a, 800b and 800c, database engine program 104, security manager program 140, query optimizer program 132, and query interface program 134a and 134b, respectively, are loaded into one or more computer-readable tangible storage devices 830 of internal components 800a, 800b and 800c, respectively. The network may comprise copper wires, optical fibers, wireless transmission, routers, firewalls, switches, gateway computers and/or edge servers.

Each of the sets of external components 900a,b,c includes a computer display monitor 920, a keyboard 930, and a computer mouse 934. Each set of internal components 800a,b,c also includes device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Database engine program 104, security manager program 140, query optimizer program 132, and query interface program 134a and 134b can be written in various programming languages including low-level, high-level, object-oriented or non object-oriented languages. Alternatively, the functions of database engine program 104, security manager program 140, query optimizer program 132, and query interface program 134a and 134b can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for optimizing a query requiring a join operation in a secure data access environment in a data processing system, the method comprising:
    providing a relational database having a first table and a second table, wherein a sensitive attribute serves as subset of a primary key for the first and second tables;
    receiving a query statement requiring a join operation of the first table and the second table, the query statement including authentication credentials;
    in response to determining that the authentication credentials allow only a masked access security view to the sensitive attribute:
    generating a first security view, the first security view granting a user access to the sensitive attribute values of the first table in a masked format, wherein the masked format value is generated from an unmasked format value using a reversible function;
    generating a second security view, the second security view granting the user access to the sensitive attribute values of the second table in a masked format, wherein the masked format value is generated from an unmasked format using a reversible function;
    generating an optimized query statement by rewriting the query statement using an inverse function of the reversible function to simplify the query statement; and
    performing the join operation between the first view and the second view by executing the optimized query statement.

2. The method of claim 1, wherein the sensitive attribute comprises a partitioning key attribute in a parallel data processing system.

3. The method of claim 1, further comprising generating a first index for accessing the sensitive attribute within the first table and generating a second index for accessing the sensitive attribute within the second table.

4. The method of claim 1, wherein the reversible function comprises an encryption transformation and wherein the inverse function comprises a decryption transformation.

5. The method of claim 1, wherein simplifying the query statement reduces the occurrences of reversible function calls.

6. A computer program product for optimizing a query requiring a join operation in a secure data access environment in a data processing system, the computer program product comprising one or more computer-readable tangible storage devices and a plurality of program instructions stored on one or more computer-readable tangible storage devices, the plurality of program instructions comprising:
    program instructions to provide a relational database having a first table and a second table, wherein a sensitive attribute serves as subset of a primary key for the first and second tables;
    program instructions to receive a query statement requiring a join operation of the first table and the second table, the query statement including authentication credentials;
    in response to determining that the authentication credentials allow only a masked access security view to the sensitive attribute:
    program instructions to generate a first security view, wherein the first security view grants a user access to the sensitive attribute values of the first table in a masked format and wherein the masked format value is generated from an unmasked format value using a reversible function;
    program instructions to generate a second security view, wherein the second security view grants the user access to the sensitive attribute values of the second table in a masked format and wherein the masked format value is generated from an unmasked format using a reversible function;
    program instructions to generate an optimized query statement by rewriting the query statement using an inverse function of the reversible function to simplify the query statement; and program instructions to perform the join operation between the first view and the second view by executing the optimized query statement.

7. The computer program product of claim 6, wherein the sensitive attribute comprises a partitioning key attribute in a parallel data processing system.

8. The computer program product of claim 6, further comprising program instructions to generate a first index for accessing the sensitive attribute within the first table and to generate a second index for accessing the sensitive attribute within the second table.

9. The computer program product of claim 6, wherein the reversible function comprises an encryption transformation and wherein the inverse function comprises a decryption transformation.

10. The computer program product of claim 6, wherein simplifying the query statement reduces the occurrences of reversible function calls.

11. A computer system for optimizing a query requiring a join operation in a secure data access environment in a data processing system, the computer system comprising one or more processors, one or more computer-readable tangible storage devices, and a plurality of program instructions stored on one or more storage devices for execution by one or more processors, the plurality of program instructions comprising:
    program instructions to provide a relational database having a first table and a second table, wherein a sensitive attribute serves as subset of a primary key for the first and second tables;
    program instructions to receive a query statement requiring a join operation of the first table and the second table, the query statement including authentication credentials;
    in response to determining that the authentication credentials allow only a masked access security view to the sensitive attribute:
    program instructions to generate a first security view, wherein the first security view grants a user access to the sensitive attribute values of the first table in a masked format and wherein the masked format value is generated from an unmasked format value using a reversible function;
    program instructions to generate a second security view, wherein the second security view grants the user access to the sensitive attribute values of the second table in a masked format and wherein the masked format value is generated from an unmasked format using a reversible function;
    program instructions to generate an optimized query statement by rewriting the query statement using an inverse function of the reversible function to simplify the query statement; and
    program instructions to perform the join operation between the first view and the second view by executing the optimized query statement.

12. The computer system of claim 11, wherein the sensitive attribute comprises a partitioning key attribute in a parallel data processing system.

13. The computer system of claim 11, further comprising program instructions to generate a first index for accessing the sensitive attribute within the first table and to generate a second index for accessing the sensitive attribute within the second table.

14. The computer system of claim 11, wherein simplifying the query statement reduces the occurrences of reversible function calls.

\* \* \* \* \*